United States Patent
Jobetto et al.

(10) Patent No.: US 11,295,369 B2
(45) Date of Patent: Apr. 5, 2022

(54) INFORMATION PROCESSING APPARATUS, SERVICE PROVIDING SYSTEM, AND METHOD FOR CONTROLLING INFORMATION PROCESSING APPARATUS

(71) Applicant: SEIKO EPSON CORPORATION, Tokyo (JP)

(72) Inventors: Satoshi Jobetto, Shiojiri (JP); Ikumi Watanabe, Shiojiri (JP); Mikio Nagahara, Alexandra View (SG); Hiroshi Kaiho, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/952,606

(22) Filed: Nov. 19, 2020

(65) Prior Publication Data

US 2021/0158427 A1     May 27, 2021

(30) Foreign Application Priority Data

Nov. 22, 2019    (JP) .............................. JP2019-211165

(51) Int. Cl.
| | |
|---|---|
| *G06F 15/00* | (2006.01) |
| *G06F 3/12* | (2006.01) |
| *G06K 1/00* | (2006.01) |
| *G06Q 30/06* | (2012.01) |
| *G06N 20/00* | (2019.01) |
| *G06Q 50/28* | (2012.01) |

(52) U.S. Cl.
CPC ....... *G06Q 30/0633* (2013.01); *G06F 3/1203* (2013.01); *G06F 3/1229* (2013.01); *G06N 20/00* (2019.01); *G06Q 30/0603* (2013.01); *G06Q 50/28* (2013.01)

(58) Field of Classification Search
CPC .......... G06Q 30/0633; G06Q 30/0603; G06Q 50/28; G06N 20/00; G06F 3/1203; G06F 3/1229
USPC ............................... 358/1.15, 1.13, 1.14, 1.1
See application file for complete search history.

(56) References Cited

U.S. PATENT DOCUMENTS

| | | | |
|---|---|---|---|
| 2012/0072376 A1* | 3/2012 | Akiyama ........... | G06Q 30/0283 705/400 |
| 2017/0090830 A1* | 3/2017 | Tomono ................ | G06F 3/1235 |
| 2021/0357974 A1* | 11/2021 | Okamoto .............. | G09F 3/0297 |

FOREIGN PATENT DOCUMENTS

JP        2011-035779 A     2/2011

* cited by examiner

*Primary Examiner* — Douglas Q Tran
(74) *Attorney, Agent, or Firm* — Workman Nydegger

(57) ABSTRACT

A service providing server providing a delivery service delivering ink includes an obtaining section configured to obtain first use information associated with use of the delivery service by a first user, a determination section configured to determine a corresponding charge plan which is one of charge plans of the delivery service corresponding to the first use information obtained by the obtaining section based on the first use information obtained by the obtaining section, second use information associated with use of the delivery service by a second user, and a selected charge plan which is one of the charge plans of the delivery service selected by the second user, and a display controller configured to display corresponding charge plan information indicating the corresponding charge plan determined by the determination section in a terminal device of the first user.

11 Claims, 7 Drawing Sheets

| 113A | 113B | 113C | 113D | 113E | 113F | 113G | 113H |
|---|---|---|---|---|---|---|---|
| ACCOUNT ID | PASSWORD | DELIVERY DESTINATION INFORMATION | CHARGE PLAN INFORMATION | SERIAL NUMBER | PAYMENT METHOD INFORMATION | PAYMENT DATA INFORMATION | PAYMENT STATE INFORMATION |

| 113E | 114A | 114B | 114C |
|---|---|---|---|
| SERIAL NUMBER | TOTAL INK USE AMOUNT INFORMATION | TOTAL COPY COUNT INFORMATION | LOG FILE |

INFORMATION PROCESSING APPARATUS, SERVICE PROVIDING SYSTEM, AND METHOD FOR CONTROLLING INFORMATION PROCESSING APPARATUS

The present application is based on, and claims priority from JP Application Serial Number 2019-211165, filed Nov. 22, 2019, the disclosure of which is hereby incorporated by reference herein in its entirety.

BACKGROUND

1. Technical Field

The present disclosure relates to an information processing apparatus, a service providing system, and a method for controlling the information processing apparatus.

2. Related Art

In general, techniques of proposing a charge plan for using a service have been used. JP-A-2011-35779 discloses a system of calculating fees by applying information on a job log of a user to a plurality of charge plans and proposing a cheapest one of the calculated charge plans for the user.

In general, charge plans have been proposed also in delivery services for delivering consumables of print apparatuses. However, general charge plans proposed in delivery services are based on information on use of services of a user, such as job log information disclosed in JP-A-2011-35779, and information on use of other users is not taken into consideration. Therefore, in general, a most suitable charge plan may not be proposed for the user.

SUMMARY

According to an aspect of the present disclosure, an information processing apparatus providing a delivery service delivering consumables of a print apparatus includes an obtaining section configured to obtain first use information associated with use of the delivery service by a first user, a determination section configured to determine a corresponding charge plan which is one of charge plans of the delivery service corresponding to the first use information obtained by the obtaining section based on the first use information obtained by the obtaining section, second use information associated with use of the delivery service by a second user, and a selected charge plan which is one of the charge plans of the delivery service selected by the second user, and a display controller configured to display corresponding charge plan information indicating the corresponding charge plan determined by the determination section in a terminal device of the first user.

In the information processing apparatus, the first use information may include first use state information indicating a use state of the first user in the delivery service.

In the information processing apparatus, the second use information may include second use state information indicating a use state of the second user in the delivery service.

In the information processing apparatus, the first use state information may include copy count information indicating the number of copies of print media copied by the print apparatus, the information processing apparatus further includes a calculation section configured to calculate a charge amount to be charged by the first user when the first user selects the corresponding charge plan based on the number of copies indicated by the copy count information and the corresponding charge plan determined by the determination section, and the display controller displays charge amount information indicating the charge amount calculated by the calculation section along with the corresponding charge plan information in the terminal device.

The information processing apparatus may further include a storage section configured to store a learnt model obtained by machine learning performed based on a data set in which the second use information and selected charge plan information indicating the selected charge plan are associated with each other. The determination section may input the first use information obtained by the obtaining section to the learnt model stored in the storage section, output charge plan information indicating the charge plan from the learnt model, and determine the charge plan indicated by the charge plan information output from the learnt model as the corresponding charge plan.

The information processing apparatus may further include a first reception section configured to receive an admission request for the delivery service by the first user. The display controller may display the corresponding charge plan information in the terminal device when the first reception section receives the admission request.

The information processing apparatus may further include a second reception section configured to receive a request for cancelling the delivery service from the first user. The display controller may display the corresponding charge plan information in the terminal device when the second reception section receives the cancel request.

In the information processing apparatus, the charge plan may be a plan in which at least a charge for use of the delivery service in a predetermined period of time and the number of printable sheets which is the number of sheets printable by the print apparatus without charge in addition to the charge for use in the predetermined period of time are prescribed. The determination section may determine the corresponding charge plan by differentiating at least one of the charge for use and the number of printable sheets in accordance with a date and time when start of use of the delivery service is available based on the corresponding charge plan.

In the information processing apparatus, the determination section may determine the corresponding charge plan in which the number of printable sheets is differentiated in accordance with a month when start of use of the delivery service is available based on the corresponding charge plan.

According to another aspect of the present disclosure, a service providing system providing a delivery service delivering consumables of a print apparatus includes an obtaining section configured to obtain first use information associated with use of the delivery service by a first user, a determination section configured to determine a corresponding charge plan which is one of charge plans of the delivery service corresponding to the first use information obtained by the obtaining section based on the first use information obtained by the obtaining section, second use information associated with use of the delivery service by a second user, and a selected charge plan which is one of the charge plans of the delivery service selected by the second user, and a display controller configured to display corresponding charge plan information indicating the corresponding charge plan determined by the determination section in a terminal device of the first user.

According to a further aspect of the present disclosure, a method for controlling an information processing apparatus providing a delivery service delivering consumables of a print apparatus includes obtaining first use information associated with use of the delivery service by a first user, determining a corresponding charge plan which is one of charge plans of the delivery service corresponding to the first use information obtained by the obtaining section based on the first use information obtained by the obtaining section, second use information associated with use of the delivery service by a second user, and a selected charge plan which is one of the charge plans of the delivery service selected by the second user, and displaying corresponding charge plan information indicating the corresponding charge plan determined by the determination section in a terminal device of the first user.

BRIEF DESCRIPTION OF THE DRAWINGS

FIG. 3 is a diagram illustrating an example of an account management database.

FIG. 4 is a diagram illustrating an example of a printer management database.

DESCRIPTION OF EXEMPLARY EMBODIMENT

Figure 1:
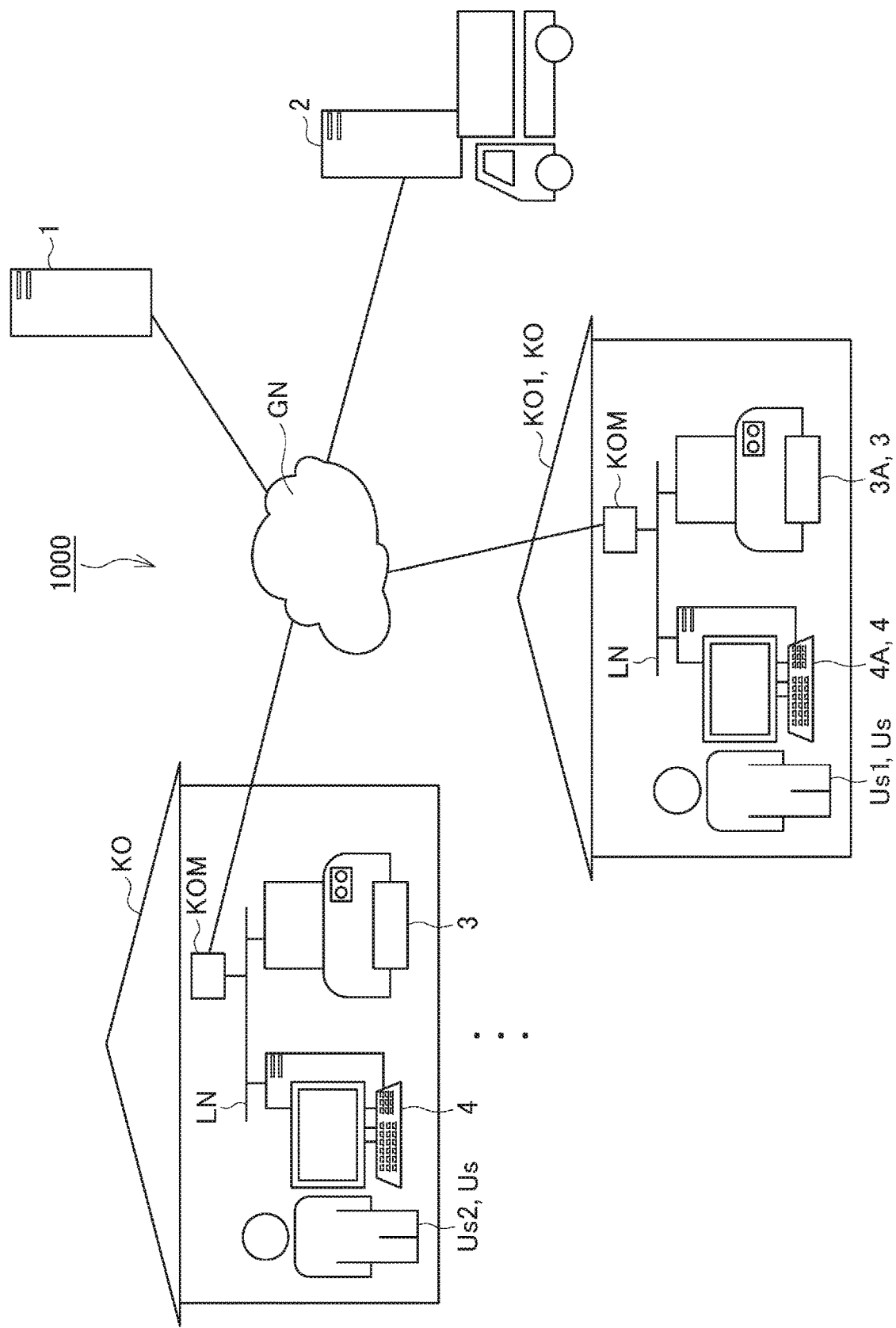
FIG. 1 is a diagram illustrating a configuration of a service providing system.

FIG. 1 is a diagram illustrating a configuration of a service providing system 1000.

The service providing system 1000 provides delivery services of delivering consumables of a printer 3. The printer 3 corresponds to an example of a print apparatus. A user pays charge for use of the delivery service in a predetermined period of time, that is, the delivery service employs a so-called subscription method.

In this embodiment, a person to use the delivery service and a user using the delivery service are collectively referred to as a user Us. In FIG. 1, a plurality of users Us are illustrated. In a description below, a user Us to which a reference symbol "Us1" is assigned is referred to as a "first user". Furthermore, another user Us different from the first user Us1 is referred to as a "second user Us2". Note that concept of the user Us may include a subject, such as a company, in addition to a person.

The service providing system 1000 includes a service providing server 1. The service providing server 1 corresponds to an example of an information processing apparatus. The service providing server 1 is a server device providing a delivery service. The service providing server 1 is coupled to a global network GN including the Internet, a telephone network, and other communication networks so as to communicate with apparatuses coupling to the global network GN. The service providing server 1 is possessed by a company running a delivery service.

Note that, although the service providing server 1 is represented by one block in the drawings, it is not necessarily the case that the service providing server 1 is constituted by a single server device. For example, the service providing server 1 may include different server devices performing different processes.

The service providing system 1000 includes a delivery server 2. The delivery server 2 is a server device instructing deliverers to deliver delivery articles. The delivery server 2 instructs deliverers who are employees of a company to which a company running delivery services outsources delivery operations to perform delivery. The delivery server 2 is coupled to the global network GN so as to communicate with an apparatus coupled to the global network GN. In this embodiment, delivery articles instructed to be delivered by the delivery server 2 are the printer 3 and consumables of the printer 3 in this embodiment. In this embodiment, an example of the consumables of the printer 3 is ink.

Note that although the delivery server 2 is represented by one block in the drawings, it is not necessarily the case that the delivery server 2 is constituted by a single server device. For example, the delivery server 2 may include different server devices performing different processes.

The service providing system 1000 includes a plurality of printers 3. In the drawings, an example in which an article is delivered to a house KO in response to a delivery instruction issued by the delivery server 2 is illustrated.

The printer 3 is a print device employing a continuous ink supply system (CISS) method in which an ink tank 321 supplying ink to an ink jet head is filled with ink after the fact. Note that the printer 3 of this embodiment is a possession of a subject running the delivery service.

In a description below, the printer 3 used by a first user Us1 in the delivery service is referred to as a "printer 3A".

The printer 3 is coupled to a local network LN set in the house KO and communicates with the apparatuses coupled to the global network GN through a house communication device KOM coupled to the local network LN.

The house communication device KOM is an interface device coupling the local network LN and the global network GN to each other. The house communication device KOM has a function of a modem or an optical network unit (ONU), a router function, a network address translation (NAT) function, a dynamic host configuration protocol (DHCP) server function, and so on. The house communication device KOM transfers data transmitted and received between an apparatus coupled to the local network LN and an apparatus coupled to the global network GN in communication between the apparatuses.

Note that although the house communication device KOM is represented by one block in the drawings, the house communication device KOM may include different devices having different functions.

The service providing system 1000 includes a plurality of terminal devices 4.

The terminal devices 4 are computers possessed by users Us. Each of the terminal devices 4 is coupled to the local network LN so as to communicate with the printer 3 coupled to the local network LN and the apparatuses coupled to the global network GN.

In a description below, one of the terminal devices 4 possessed by the first user Us1 is referred to as a "terminal device 4A".

Note that, although the terminal devices 4 illustrated in FIG. 1 are desktop computers, the terminal devices 4 may be laptop type computers or tablet type computers. Furthermore, when each of the terminal devices 4 may be coupled to the global network GN without using the local network LN, the terminal device 4 may communicate with apparatuses coupled to the global network GN without using the local network LN. Moreover, each of the terminal devices 4 may communicate with the printer 3 by a one-to-one communication method. Examples of this communication method include a direct communication method of wireless communication without using access points, such as Wi-Fi Direct. Wi-Fi is a registered trademark.

In a delivery service provided by the service providing server 1, the printer 3 and ink to be consumed by the printer 3 are delivered to a delivery destination specified by the user Us. In the delivery service, ink stored in an ink bottle is delivered. For example, in a case of FIG. 1, in the delivery service, the printer 3A and ink to be consumed by the printer 3A are delivered by a subject possessing the delivery server 2 to a house KO1 specified by the first user Us1 as a delivery destination.

In the delivery service, a plurality of charge plans are set to use the delivery service. In this embodiment, two types of charge plans, that is, a charge plan of "a flat-rate system+a surplus meter-rate system" and a charge plan of "a multi-stage flat-rate system" are set.

In the charge plan of "a flat-rate system+a surplus meter-rate system", a predetermined number of copies may be printed in a flat rate by the printer 3 in a predetermined period of time and copies exceeding the predetermined number of copies are charged in accordance with the number of copies. In this embodiment, first to third charge plans are examples of the charge plan of "the flat-rate system+surplus meter-rate system". Note that, in this embodiment, a charge plan in which the predetermined period of time corresponds to one month is illustrated.

In the first charge plan, a charge for use per month is denoted by X1 and the number of sheets which are printable with this charge for use without extra charge per month is denoted by Y1. In a description below, the number of sheets which are printable with this charge for use without extra charge is referred to as "the number of printable sheets". Furthermore, in the first charge plan, a sheet is charged by Z1 (Z1<X1) for printing exceeding the number of printable sheets.

In the second charge plan, a charge for use per month is denoted by X2 (X2>X1) and the number of printable sheets with this charge for use is denoted by Y2 (Y2>Y1). Furthermore, in the second charge plan, a sheet is charged by Z1 (Z1<X2) for printing exceeding the number of printable sheets.

In the third charge plan, a charge for use per month is denoted by X3 (X3>X2) and the number of printable sheets with this charge for use is denoted by Y3 (Y3>Y2). Furthermore, in the third charge plan, a sheet is charged by Z1 (Z1<X3) for printing exceeding the number of printable sheets.

In the charge plan of the "multistage flat-rate system", the charge for use and the number of printable sheets in a predetermined period of time are prescribed in a plurality of stages. According to this embodiment, the fourth charge plan is the charge plan of the "multistage flat-rate system".

In the fourth charge plan, the charge for use is X1 when the number of copies per month is equal to or smaller than Y1, the charge for use is X2 when the number of copies per month is within a range from Y1+1 to Y2, the charge for use is X3 when the number of copies per month is within a range from Y2+1 to Y3. In the fourth charge plan, Y1, Y2, and Y3 are individually the numbers of printable sheets. Specifically, in the fourth charge plan, the charge for use and the number of printable sheets are prescribed in three stages. In the fourth charge plan, a sheet is charged by Z1 for printing exceeding the number of printable sheets Y3.

Note that the first to fourth charge plans are merely examples, and the charge for use, a unit of the charge for use, the number of printable sheets, and a charge amount per sheet are not limited to those described above.

Each of the users Us selects one of the first to fourth charge plans at a timing when a membership registration is performed for the delivery service, for example. Then each of the users Us pays the charge for use prescribed by the selected charge plan every month. Furthermore, each of the users Us also pays a charge for extra copies along with the charge for use prescribed by the selected charge plan when printing excessing the number of printable sheets is performed.

Next, functional configurations of the devices included in the service providing system 1000 will now be described.

First, a functional configuration of the service providing server 1 will be described.

Figure 2:
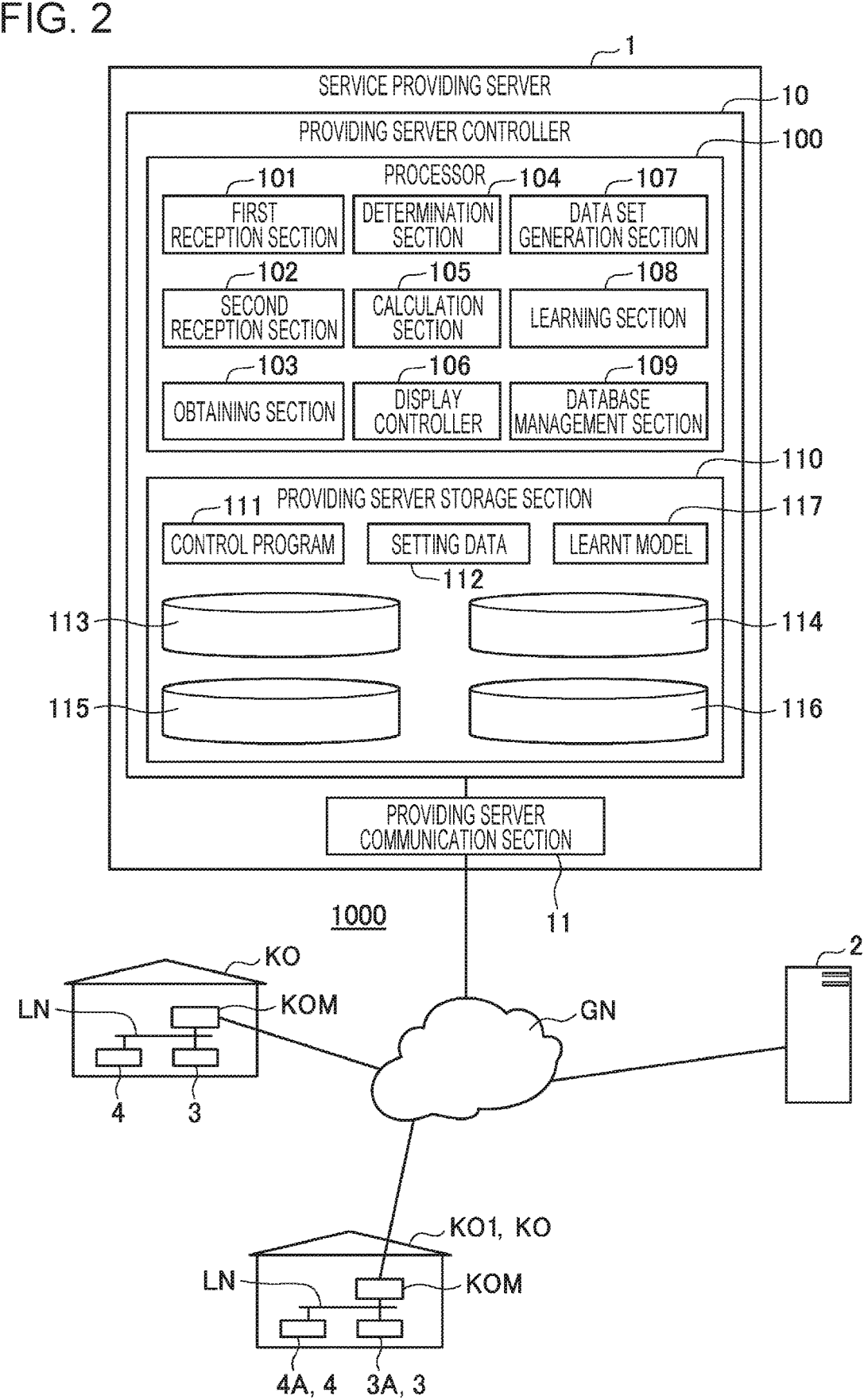
FIG. 2 is a block diagram illustrating a functional configuration of a service providing server.

FIG. 2 is a block diagram illustrating a functional configuration of the service providing server 1.

The service providing server 1 includes a providing server controller 10.

The providing server controller 10 includes a processor 100 executing programs, such as a central processing unit (CPU) or a micro processing unit (MPU), and a providing server storage section 100, and controls the various sections included in the service providing server 1. The providing server storage section 110 corresponds to an example of a storage section. The providing server controller 10 executes various processes by combination between hardware and software such that the processor 100 reads a control program 111 stored in the providing server storage section 110 and executes a process.

The providing server controller 10 causes the processor 100 to read and execute the control program 111 so as to function as a first reception section 101, a second reception section 102, an obtaining section 103, a determination section 104, a calculation section 105, a display controller 106, a data set generation section 107, a learning section 108, and a database management section 109. These functional sections will be described in detail hereinafter.

The providing server storage section 110 has a storage region storing programs to be executed by the processor 100 and data to be processed by the processor 100. The providing server storage section 110 stores the control program 111 to be executed by the processor 100 and setting data 112 including various setting values associated with operations of the service providing server 1. The providing server storage section 110 has a nonvolatile storage region storing in a nonvolatile manner programs and data. The providing server storage section 110 may further have a volatile storage region temporarily storing programs to be executed by the processor 100 and data to be processed.

The providing server storage section 110 stores, in addition to the control program 111 and the setting data 112, an account management database 113, a printer management database 114, a use information management database 115, a data set management database 116, and a learnt model 117.

First, the account management database 113 will be described.

The account management database 113 manages accounts assigned to members of the delivery service provided by the service providing server 1.

FIG. 3 is a diagram schematically illustrating information included in a record stored in the account management database 113.

As illustrated in FIG. 3, the record of the account management database 113 includes an account ID 113A, a password 113B, delivery destination information 113C, charge plan information 113D, a serial number 113E, payment method information 113F, payment date information 113G, and payment state information 113H.

The account ID 113A is identification information identifying an account assigned to a member of the delivery service, that is, a user of the delivery service. For example, when a user Us performs a member registration of the delivery service, the account ID 113A is automatically assigned to an account assigned to the user Us.

The password 113B is authentication information for authenticating an account. For example, when the user Us performs a member registration of the delivery service, the user Us sets the password 113B.

The delivery destination information 113C indicates a delivery destination of a delivery article. For example, the user Us sets the delivery destination information 113C when performing the member registration of the delivery service. The delivery destination information 113C may be changed even after being stored in the account management database 113, that is, after the member registration of the delivery service is performed.

The charge plan information 113D indicates a charge plan selected by the user Us. In this embodiment, a charge plan indicated by the charge plan information 113D is one of the first to fourth charge plans. The charge plan information 113D is updated by the database management section 109 where appropriate.

The serial number 113E is an identification number identifying the printer 3.

The payment method information 113F indicates a payment method of a charge for use of the delivery service. For example, when indicating a payment method using a credit card, the payment method information 113F includes a combination of information indicating that payment is to be performed by the credit card and a number of the credit card. The user Us sets the payment method information 113F when performing the membership registration for the delivery service, for example. As with the delivery destination information 113C, the payment method information 113F may be changed even after the membership registration of the delivery service is performed.

The payment date information 113G indicates a date of payment of the charge for use of the delivery service. Since the delivery service employs a subscription method, a payment date indicated by the payment date information 113G is represented by a form of dd/mm, for example. For example, the payment date information 113G indicates a payment date represented by the form of dd/mm using a starting date of use of the delivered printer 3 as a starting point.

The payment state information 113H indicates a payment state of the charge for use of the delivery service. The payment state information 113H indicates "paid" or "unpaid". The database management section 109 sends an inquiry to the subject which takes care of payment of the charge for use in a payment date indicated by the payment date information 113G so as to obtain a payment state from the subject and updates the payment state information 113H where appropriate.

Next, the printer management database 114 will be described.

The printer management database 114 manages the printer 3.

FIG. 4 is a diagram schematically illustrating information included in a record stored in the printer management database 114.

As illustrated in FIG. 4, the record of the printer management database 114 includes a serial number 113E, a total ink use amount information 114A, a total copy count information 114B, and a log file 114C.

The total ink use amount information 114A indicates a total amount of ink used by the printer 3 after the printer 3 is delivered. In a description below, the total amount of ink used after the printer 3 is delivered is referred to as a "total ink use amount". The total ink use amount information 114A is updated by the database management section 109 where appropriate.

The total copy count information 114B indicates the total number of print media printed by the printer 3 in a predetermined period of time prescribed by a charge plan. In this embodiment, the predetermined period of time prescribed by the charge plan is one month. Therefore, the total copy count information 114B indicates the total number of print media printed by the printer 3 in a month. The total copy count information 114B is updated by the database management section 109 where appropriate. Furthermore, the total number of print media indicated by the total copy count information 114B is set to 0 by the database management section 109 when the charge for use is paid in a payment date indicated by the payment date information 113G.

The log file 114C includes description of log information. The log information indicates a log of a plurality of monitoring items. The monitoring items are determined to be targets of log in advance and obtained by monitoring a state of the printer 3. Examples of the monitoring items include a printer error. As a log of the monitoring item of the printer error, the log file 114C includes information indicating occurrence of a printer error along with information indicating a date and time in time series. The printer error corresponds to a state in which normal printing may not be performed due to an error of an ink jet head or the like.

Figure 5:
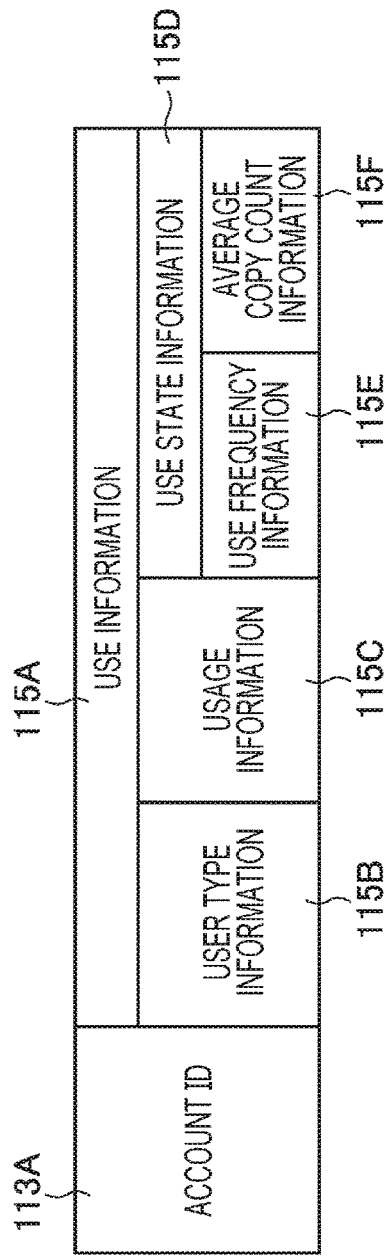
FIG. 5 is a diagram illustrating an example of a use information management database.

FIG. 5 is a diagram schematically illustrating information included in a record stored in the use information management database 115.

As illustrated in FIG. 5, the record of the use information management database 115 includes an account ID 113A and use information 115A. The use information 115A includes user type information 115B, usage information 115C, and use state information 115D.

In a description below, use information 115A of the first user Us1 is referred to as "first use information". Furthermore, use information 115A of the second user Us2 is referred to as "second use information". Use state information 115D included in the first use information is referred to as "first use state information". Use state information 115D included in the second use information is referred to as "second use state information".

The user type information 115B indicates a type of the user Us. In this embodiment, a type indicated by the user type information 115B is a private, SOHO, a company, or a printing company. Note that other types may be added as the types of the users Us, the type may be segmentalized, or a smaller number of types may be provided. The user type information 115B is set by the user Us when the user Us performs membership registration of the delivery service, for example. The user type information 115B may be changed even after being stored in the use information management database 115, that is, even after the membership registration of the delivery service.

The usage information 115C indicates usage of the printer 3 delivered by the delivery service. In this embodiment, the usage of the printer 3 indicated by the usage information 115C is photograph printing, monochrome document printing, color document printing, or generation of a booklet. Note that other types of usage may be added to the usage of the printer 3 indicated by the usage information 115C, the usage may be segmentalized, or a smaller number of types of usage may be provided. The usage information 115C is set by the user Us when the user Us performs membership registration of the delivery service, for example. The usage information 115C may be changed even after being stored in the use information management database 115, that is, even after the membership registration of the delivery service.

The use state information 115D indicates a use state of the user Us in the delivery service. The use state information 115D includes use frequency information 115E and average copy count information 115F. The average copy count information 115F corresponds to an example of copy count information.

The use frequency information 115E indicates frequency of printing performed by the printer 3 in a predetermined period of time. The use frequency information 115E is updated by the database management section 109 where appropriate.

The average copy count information 115F indicates an average copy count which is an average of the numbers of copies in the predetermined period of time prescribed by the charge plan. As described above, in this embodiment, the predetermined period of time corresponds to one month in the charge plan. Therefore, in this embodiment, the average copy count information 115F indicates an average copy count per month.

The average copy count information 115F is updated in a payment date every month. The database management section 109 obtains a payment state from the subject which takes care of the payment of charge for use of a certain record in a payment data indicated by the payment date information 113G of the certain record included in the account management database 113. When the obtained payment state indicates "paid", the database management section 109 specifies a record having an account ID 113A in the use information management database 115 which matches an account ID 113A included in the certain record and specifies a record having a serial number 113E in the printer management database 114 which matches a serial number 113E included in the certain record. Then the database management section 109 calculates the average copy count at a current time point based on the average copy count indicated by the average copy count information 115F included in the specified record in the use information management database 115 and a total copy count indicated by the total copy count information 114B included in the specified record in the printer management database 114. The database management section 109 updates the average copy count indicated by the average copy count information 115F included in the specified record in the use information management database 115 to the calculated average copy count.

Figure 6:
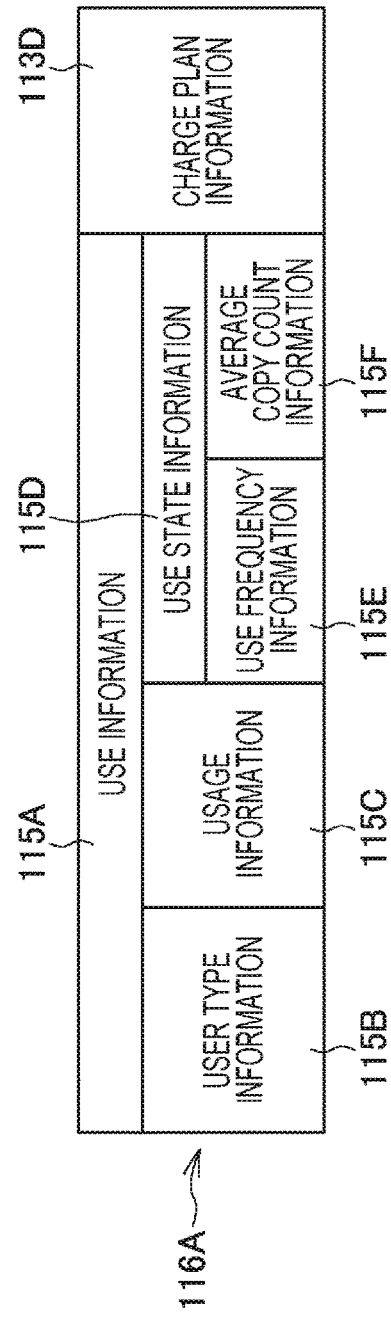
FIG. 6 is a diagram illustrating an example of a data set management database.

FIG. 6 is a diagram schematically illustrating information included in a record stored in the data set management database 116.

As illustrated in FIG. 6, the record of the data set management database 116 indicates one data set 116A. The data set 116A is configured by associating the charge plan information 113D with the use information 115A.

As described below, the data set management database 116 stores the data set 116A generated by the data set generation section 107 based on the account management database 113 and the use information management database 115. Accordingly, the data set management database 116 stores at least the data set 116A configured by associating the charge plan information 113D indicating the charge plan selected by the second user Us2 with the second use information. Note that, when the first user Us1 has been registered the membership of the delivery service, a data set 116A configured by associating a charge plan information 113D indicating a charge plan selected by the first user Us1 with the first use information is stored in the data set management database 116.

In a description below, a charge plan selected by the second user Us2 is referred to as a "selected charge plan" and information on the charge plan indicating the charge plan selected by the second user Us2 is referred to as "selected charge plan information".

In the data set 116A, the user type information 115B, the usage information 115C, the use frequency information 115E, and the average copy count information 115F are associated with the charge plan information 113D.

The copy count per month may vary depending on a type of user Us indicated by the user type information 115B. Therefore, a charge plan selected by the user Us may vary depending on the type of the user Us. Therefore, the data set 116A includes the user type information 115B as information correlated with the charge plan information 113D.

The copy count per month may vary depending on a usage of the user Us indicated by the usage information 115C. Therefore, the charge plan selected by the users Us may vary depending on the usage of the user Us. Therefore, in the data set 116A, the usage information 115C is included as information correlated with the charge plan information 113D.

The copy count per month may vary depending on use frequency of the user Us indicated by the use frequency information 115E. Therefore, the charge plan selected by the user Us may vary depending on the use frequency of the user Us. Accordingly, in the data set 116A, the use frequency information 115E is included as information correlated with the charge plan information 113D.

The copy count per month may vary depending on an average copy count indicated by the average copy count information 115F. Therefore, the charge plan selected by the user Us may vary depending on the average copy count. Accordingly, the data set 116A includes the average copy count information 115F as information correlated with the charge plan information 113D.

The learnt model 117 is obtained by machine learning performed based on the data set 116A generated by the data set generation section 107. The learnt model 117 receives the use information 115A as an input and outputs the charge plan information 113D. The learnt model 117 is configured as a program to be executed by the determination section 104.

The service providing server 1 includes a providing server communication section 11.

The providing server communication section 11 includes communication hardware based on a predetermined communication standard and communicates with an apparatus coupled to the global network GN in accordance with the predetermined communication standard under control of the providing server controller 10. Examples of the apparatus coupled to the global network GN include the printer 3, the terminal devices 4, and the delivery server 2.

As described above, the providing server controller 10 functions as the first reception section 101, the second reception section 102, the obtaining section 103, the determination section 104, the calculation section 105, the display controller 106, the data set generation section 107, the learning section 108, and the database management section 109.

The first reception section 101 receives an admission request for the delivery service from the user Us. The first reception section 101 determines that the admission request for the delivery service has been received from the user Us when the providing server communication section 11 receives information on the admission request from one of the terminal devices 4. The admission request information includes the use information 115A of the user Us obtained at the time of the admission request. The use information 115A included in the admission request information includes the use frequency information 115E indicating use frequency per month estimated by the user Us and the average copy count information 115F indicating the number of copies per month estimated by the user Us. The first reception section 101 notifies the obtaining section 103 of information indicating a reception of the admission request when determining that the admission request has been received.

The second reception section 102 receives a cancel request for cancelling the delivery service from the user Us. The second reception section 102 determines that the cancel request for canceling the delivery service has been received from the user Us when the providing server communication section 11 receives information on the cancel request from one of the terminal devices 4. The cancel request information includes the account ID 113A and the password 113B. The second reception section 102 notifies the obtaining section 103 of information on a reception of the cancel request when determining that the cancel request has been received.

The obtaining section 103 obtains the use information 115A included in the admission request information received by the first reception section 101 from the first reception section 101 when receiving the notification indicating the reception of the admission request from the first reception section 101. Furthermore, the obtaining section 103 specifies a record having an account ID 113A matching an account ID 113A included in the cancel request information in the use information management database 115 when receiving information on the reception of the cancel request from the second reception section 102. Then the obtaining section 103 obtains use information 115A included in the specified record. Furthermore, the obtaining section 103 specifies a record having an account ID 113A matching an account ID 113A included in printer information described below when the database management section 109 determines that printing exceeding the number of printable sheets has been performed. Then the obtaining section 103 obtains use information 115A included in the specified record.

The determination section 104 determines a corresponding charge plan based on one of the first and second determination processes. The corresponding charge plan corresponds to the use information 115A obtained by the obtaining section 103, that is, the corresponding charge plan corresponds to the user type information 115B, the usage information 115C, the use frequency information 115E, and the average copy count information 115F. The corresponding charge plan is recommended for the user Us.

First Determination Process

In the first determination process, the determination section 104 determines a corresponding charge plan by grouping.

Figure 7:
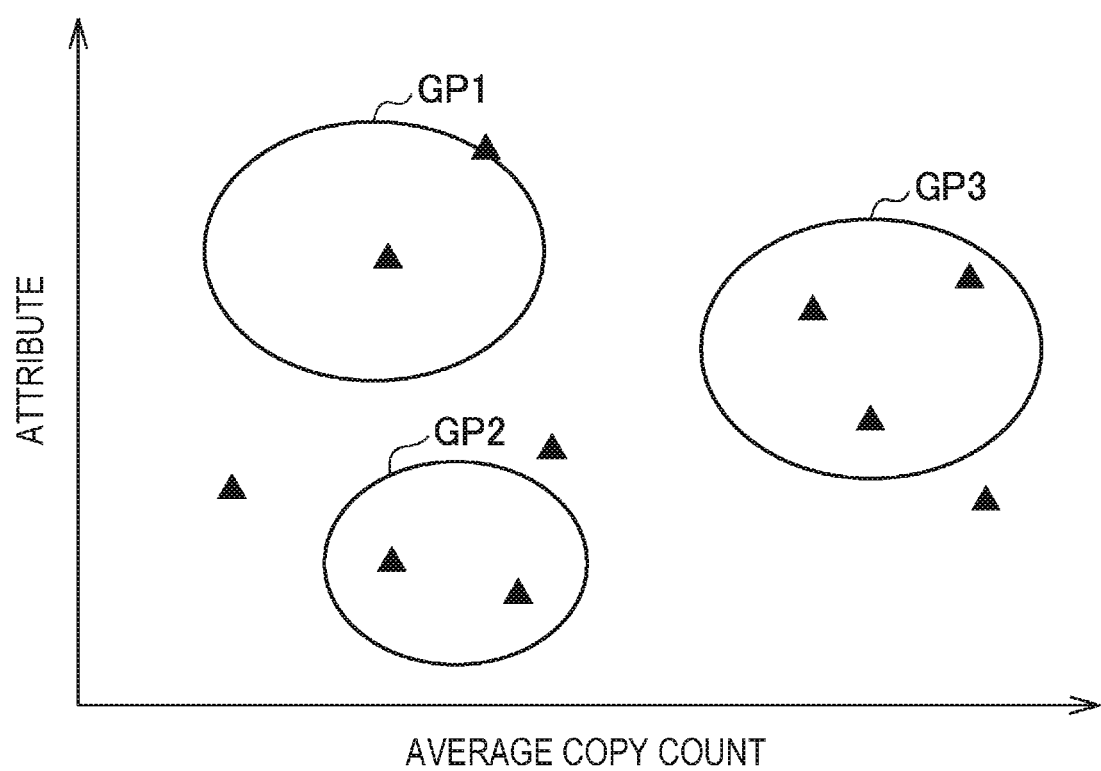
FIG. 7 is a graph illustrating a first determination process.

FIG. 7 is a diagram illustrating the first determination process.

In FIG. 7, an axis of ordinates denotes an attribute of a user of the delivery service obtained by digitalizing use frequency, a type of the user Us, and usage in accordance with a predetermined algorithm and an axis of abscissae denotes an average copy count.

The determination section 104 first specifies one record in the use information management database 115 and obtains user type information 115B, usage information 115C, and use frequency information 115E of the specified record. The determination section 104 digitalizes a type indicated by the obtained user type information 115B, usage indicated by the obtained usage information 115C, and use frequency indicated by the obtained use frequency information 115E so as to obtain a value indicating an attribute of the user Us in accordance with a predetermined algorithm. Thereafter, the determination section 104 obtains average copy count information 115F in the specified record of the use information management database 115. The determination section 104 plots the value of the attribute obtained by the digitalization as a value in the axis of ordinates and an average copy count indicated by the obtained average copy count information 115F as a value in the axis of abscissae in a predetermined coordinate system. After the plotting of the record is completed, the determination section 104 similarly performs the plotting on all remaining records stored in the use information management database 115.

When the plotting on all the records has been completed, the determination section 104 performs grouping by a multivariate analysis technique, such as Mahalanobis' generalized distance. In this way, the determination section 104 groups users of the delivery service. In FIG. 7, the determination section 104 performs grouping on the plurality of plots, that is, the users of the delivery service, into three groups GP1 to GP3.

Subsequently, the determination section 104 similarly performs plotting on the use information 115A obtained by the obtaining section 103. The determination section 104 determines one of the groups similar to the plot or one of the groups to which the plot belongs. The determination section 104 determines a charge plan which is most frequently selected by the users included in the determined group as the corresponding charge plan. It is assumed that the plot of the use information 115A obtained by the obtaining section 103 belongs to the group GP3 and the first charge plan is selected by the largest number of users who belong to the group GP3. In this case, the determination section 104 determines the first charge plan as the corresponding charge plan.

Second Determination Process

In the second determination process, the determination section 104 determines a recommended charge plan using the learnt model 117.

The determination section 104 inputs the use information 115A obtained by the obtaining section 103 into the learnt model 117 so as to cause the learnt model 117 to output the charge plan information 113D. Then the determination section 104 determines a charge plan indicated by the charge plan information 113D output by the learnt model 117 as the corresponding charge plan.

The calculation section 105 calculates an estimated charge amount. The estimated charge amount is an amount which may be charged in accordance with the charge for use by the user Us prescribed by the recommended charge plan when the user Us selects the recommended charge plan. The estimated charge amount may be a charge amount in a certain period of time specified by the charge plan or a total charge amount in use of a predetermined period of time, such as three months.

The calculation section 105 subtracts the number of printable sheets specified by the corresponding charge plan from the average copy count indicated by the average copy count information 115F included in the use information 115A obtained by the obtaining section 103. The calculation section 105 determines whether a value obtained by the subtraction is a negative value or a positive value. The calculation section 105 obtains an estimated charge amount of zero when determining that the obtained value is a negative value. On the other hand, the calculation section 105 multiplies the value obtained by the subtraction by a charge amount per sheet prescribed by the corresponding charge plan so as to calculate a charge amount per month when determining that the obtained value is a positive value. Then the calculation section 105 calculates an estimated charge amount based on the charge amount per month. Note that, when the corresponding charge plan is a charge plan of the "multistage flat-rate system", the calculation section 105 calculates a plurality of estimated charge amounts for all numbers of printable sheets.

The display controller 106 displays the corresponding charge plan determined by the determination section 104 and the estimated charge amount calculated by the calculation section 105 in the terminal device 4. The display controller 106 causes the providing server communication section 11 to transmit the corresponding charge plan determined by the determination section 104 and display instruction information for instructing display of the estimated charge amount calculated by the calculation section 105 to the terminal device 4. The display instruction information includes corresponding charge plan information indicating the corresponding charge plan determined by the determination section 104 and estimated charge amount information indicating the estimated charge amount calculated by the calculation section 105. The estimated charge amount information corresponds to an example of charge amount information.

The data set generation section 107 generates the data set 116A used by the learning section 108 for learning. The data set generation section 107 specifies one record in the use information management database 115 and obtains use information 115A of the specified record. Furthermore, the data set generation section 107 specifies, in the account management database 113, a record of an account ID 113A which matches an account ID 113A of the specified record included in the use information management database 115 and obtains charge plan information 113D of the specified record. The data set generation section 107 generates data set 116A in which the obtained use information 115A and the charge plan information 113D are associated with each other and stores the generated data set 116A in the data set management database 116.

Examples of a timing when the data set generation section 107 generates the data set 116A include a timing when content of a certain record stored in the use information management database 115 is updated.

The learning section 108 is artificial intelligence (AI) and is configured by software or hardware constituting a neural network. The learning section 108 performs machine learning using the data set 116A stored in the use information management database 115 and updates the learnt model 117 stored in the providing server storage section 110. Specifically, the learning section 108 executes learning using the data set 116A and updates the learnt model 117 stored in the providing server storage section 110 so as to reflect a result of the learning. The learning executed by the learning section 108 in this embodiment may be realized as so-called supervised learning since the data set 116A is used. For example, in the data set 116A, the charge plan information 113D is used as a label in the machine learning so that the learning section 108 learns a type of charge plan corresponding to an input using the data set 116A.

The learning section 108 updates the learnt model 117 stored in the providing server storage section 110 at a timing when a predetermined period of time has elapsed, at a timing when data set 116A is newly stored in the data set management database 116, or the like. Note that the data set 116A used for the learning may be removed from the data set management database 116.

The database management section 109 updates content of records included in the account management database 113, the printer management database 114, and the use information management database 115 where appropriate.

Next, functional configurations of the printer 3 and the terminal devices 4 will be described.

Figure 8:
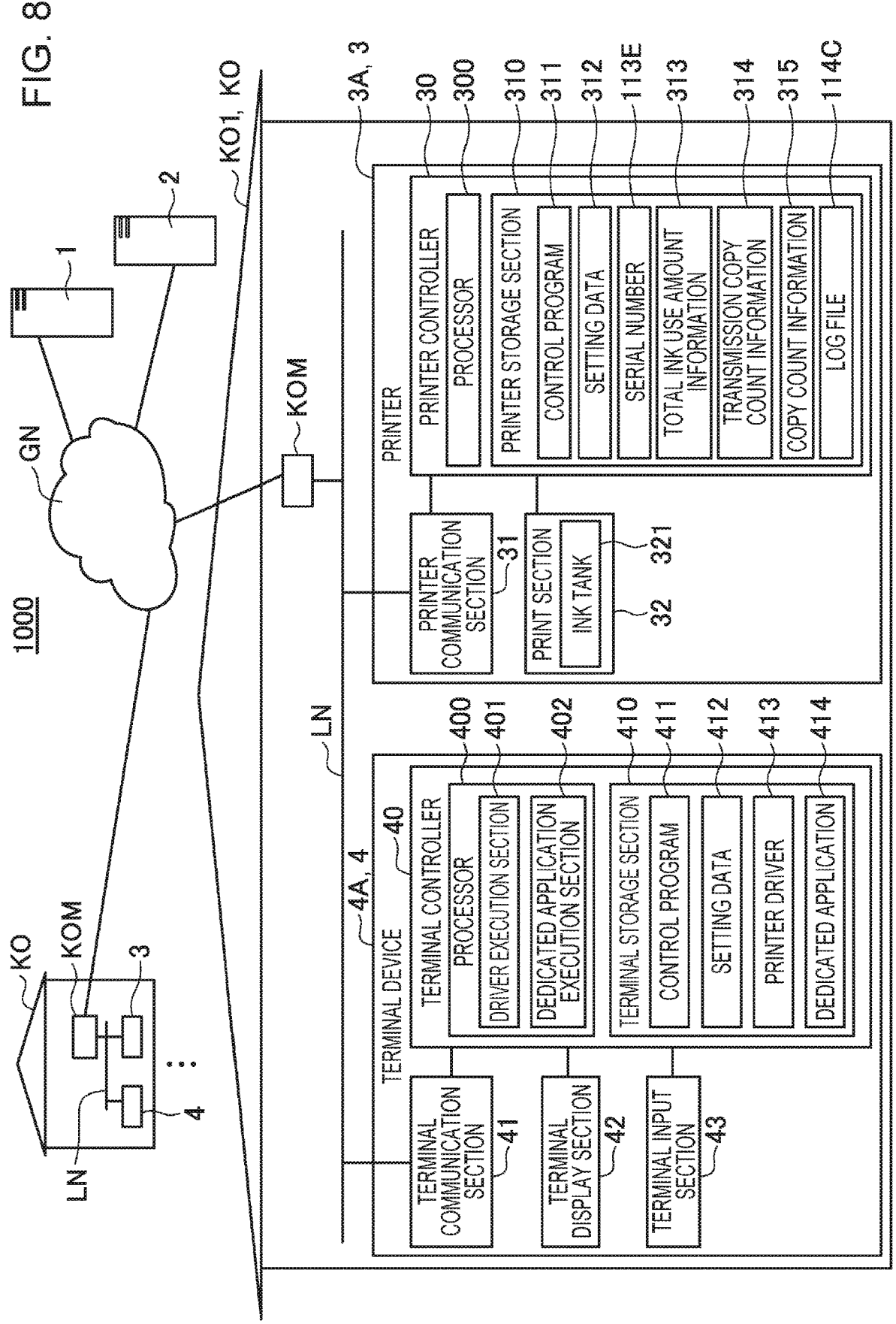
FIG. 8 is a block diagram illustrating functional configurations of a printer and a terminal device.

FIG. 8 is a block diagram illustrating functional configurations of the printer 3 and the terminal device 4.

The printer 3 includes a printer controller 30.

The printer controller 30 includes a processor 300 executing programs, such as a CPU or an MPU, and a printer storage section 310 and controls sections included in the printer 3. The printer controller 30 executes various processes as combination between hardware and software such that the processor 300 reads a control program 311 stored in the printer storage section 310 and executes a process.

The printer storage section 310 has a storage region storing programs to be executed by the processor 300 and data to be processed by the processor 300. The printer storage section 310 stores the control program 311 to be executed by the processor 300 and setting data 312 including various setting values associated with operation of the printer 3. The printer storage section 310 has a nonvolatile storage region storing programs and data in a nonvolatile manner. The printer storage section 310 may further have a volatile storage region temporarily storing programs to be executed by the processor 300 and data to be processed.

Furthermore, the printer storage section 310 stores, in addition to the control program 311 and the setting data 312, a serial number 113E, total ink use amount information 313, transmission copy count information 314, copy count information 315, and a log file 114C.

The total ink use amount information 313 indicates a total amount of ink used by the printer 3 after the printer 3 is delivered. The printer controller 30 calculates a total ink use amount at a time point when printing is terminated by adding an amount of ink used in the printing to a total ink use amount indicated by the total ink use amount information 313 stored in the printer storage section 310 every time printing is executed. Then the printer controller 30 updates the total ink use amount indicated by the total ink use amount information 313 stored in the printer storage section 310 to the calculated total ink use amount.

The transmission copy count information 314 indicates the number of print media printed by the printer 3 in a period of time from when preceding printer information is transmitted to the service providing server 1 to when next printer information is transmitted to the service providing server 1. The printer information will be described hereinafter. After transmitting the printer information to the service providing server 1, the printer controller 30 resets the number of copies indicated by the transmission copy count information 314 to 0. Furthermore, the printer controller 30 counts the number of copies in an accumulated manner every time the printing is performed until the printer information is transmitted, and updates transmission copy count information 314 stored in the printer storage section 310 to transmission copy count information 314 indicating the number of copies obtained after the counting.

The copy count information 315 indicates the number of times the printer 3 performs printing. The printer controller 30 increments the number of copies indicated by the copy count information 315 by one every time the printer 3 performs printing.

As described above, the log file 114C includes log information described therein. A first printer controller 30A monitors whether a printer error has occurred and records a log of a monitoring item of the printer error in the log file 114C based on a result of the monitoring.

The printer 3 includes a printer communication section 31.

The printer communication section 31 is configured by communication hardware based on a predetermined communication standard and communicates with apparatuses coupled to the local network LN and the global network GN in accordance with the predetermined communication standard under control of the printer controller 30. In this embodiment, the apparatuses which are coupled to the local network LN and which communicate with the printer communication section 31 are the terminal devices 4. Furthermore, the apparatus coupled to the global network GN communicating with the printer communication section 31 in this embodiment is the service providing server 1.

The printer 3 includes a print section 32.

The print section 32 has a configuration associated with printing including an ink jet head forming dots by ejecting ink to a print medium, a carriage operating the ink jet head in a scanning direction, a carriage driving motor driving the carriage, a transport unit transporting the print medium, and an ink tank 321 supplying ink to the ink jet head. The print section 32 prints an image on a print medium under control of the printer controller 30.

Each of the terminal devices 4 includes a terminal controller 40.

The terminal controller 40 includes a processor 400 executing programs, such as a CPU or an MPU, and a terminal storage section 410 and controls sections included in the terminal device 4A. The terminal controller 40 executes various processes as combination between hardware and software such that the processor 400 reads a control program 411 stored in the terminal storage section 410 and executes a process.

A printer driver 413 is installed in the terminal device 4 at a predetermined timing. The terminal controller 40 functions as a driver execution section 401 when the processor 400 reads and executes the printer driver 413.

Furthermore, a dedicated application 414 which is a dedicated application program to use the delivery service is installed in the terminal device 4. The terminal controller 40 functions as a dedicated application execution section 402 when the processor 400 reads and executes the dedicated application 414. The functions of the driver execution section 401 and the dedicated application execution section 402 will be described hereinafter.

The terminal storage section 410 has a storage region storing programs to be executed by the processor 400 and data to be processed by the processor 400. The terminal storage section 410 stores the control program 411 to be executed by the processor 400, setting data 412 including various setting values associated with operation of the terminal device 4, the printer driver 413, the dedicated application 414, and various data. The terminal storage section 410 has a nonvolatile storage region storing programs and data in a nonvolatile manner. The terminal storage section 410 may further have a volatile storage region temporarily storing programs to be executed by the processor 400 and data to be processed.

The terminal device 4 includes a terminal communication section 41.

The terminal communication section 41 includes communication hardware in accordance with the predetermined communication standard and communicates with an apparatus coupled to the local network LN and the global network GN in accordance with the predetermined communication standard under control of the terminal controller 40. The apparatus which is coupled to the local network LN communicating with the terminal communication section 41 is the printer 3 in this embodiment. Furthermore, the apparatus coupled to the global network GN communicating with the terminal communication section 41 is the service providing server 1 in this embodiment.

The terminal device 4 includes a terminal display section 42.

The terminal display section 42 includes a display panel displaying various information under control of the terminal controller 40.

The terminal device 4 includes a terminal input section 43.

The terminal input section 43 including an input unit, such as a keyboard and a mouse, detects a user operation performed on the input unit and outputs a result of the detection to the terminal controller 40. The terminal controller 40 executes a process corresponding to the user operation performed on the input unit based on the input from the terminal input section 43.

As described above, the terminal controller 40 functions as the driver execution section 401 and the dedicated application execution section 402.

The driver execution section 401 generates print data corresponding to an image to be printed by the printer 3 based on image data generated by a predetermined application program. The print data includes various control commands in accordance with a command system of the printer 3. The driver execution section 401 transmits the generated print data from the terminal communication section 41 to the printer 3.

The dedicated application execution section 402 executes a process associated with an admission request for the delivery service, a process associated with use of the delivery service, and a process associated with a request for cancelling the delivery service.

The dedicated application execution section 402 displays a user interface used for the membership registration of the delivery service, that is, a user interface used for registration of the delivery service in the terminal display section 42.

In a description below, this user interface is referred to as a "membership registration UI".

The password 113B, the delivery destination information 113C, the user type information 115B, the usage information 115C, the use frequency information 115E, the average copy count information 115F, and the payment method information 113F may be input to the membership registration UI. Note that the use frequency information 115E input to the membership registration UI indicates use frequency estimated by the user Us at a time of admission.

Furthermore, the average copy count information 115F input to the membership registration UI indicates the average number of copies estimated by the user Us at the time of admission.

In the membership registration UI, corresponding charge plan information indicating a corresponding charge plan and estimated charge amount information indicating an estimated charge amount are displayed. The estimated charge amount information corresponds to an example of charge amount information.

The dedicated application execution section 402 displays the corresponding charge plan information and the estimated charge amount information which are instructed to be displayed by display instruction information in the membership registration UI when receiving the display instruction information from the service providing server 1. The membership registration UI displays the corresponding charge plan information in a selectable manner.

Furthermore, redisplay of the corresponding charge plan information and the estimated charge amount information may be requested in the membership registration UI. The dedicated application execution section 402 transmits redisplay request information requesting the redisplay to the service providing server 1 using the terminal communication section 41 when receiving the redisplay request in using the membership registration UI. The redisplay request information includes the password 113B, the delivery destination information 113C, the user type information 115B, the usage information 115C, the use frequency information 115E, the average copy count information 115F, and the payment method information 113F to be input to the membership registration UI. Then the dedicated application execution section 402 receives the display instruction information from the service providing server 1 again and displays the corresponding charge plan information and the estimated charge amount information.

The membership registration UI includes a confirmation button confirming an input.

When the confirmation button is operated, the dedicated application execution section 402 determines that the input to the membership registration UI has been confirmed and transmits confirmation information including various information input to the membership registration UI at the time of the operation to the service providing server 1 using the terminal communication section 41. The various information input to the membership registration UI at the time of the operation at least includes the password 113B, the delivery destination information 113C, the user type information 115B, the usage information 115C, the use frequency information 115E, the average copy count information 115F, the payment method information 113F, and the charge plan information 113D. A charge plan indicated by the charge plan information 113D included in the confirmation information is the corresponding charge plan which is indicated by the corresponding charge plan information displayed in the membership registration UI and which is selected by the user Us. When receiving the confirmation information, the service providing server 1 executes an admission registration process of generating records to be stored in the account management database 113 and the use information management database 115 and storing the generated records.

The dedicated application execution section 402 displays a user interface associated with use of the delivery service in the terminal display section 42. The corresponding charge plan information and the estimated charge amount information are displayed in the user interface when the number of copies exceeds the number of printable sheets prescribed by the selected charge plan.

The dedicated application execution section 402 displays a user interface for requesting cancel of the delivery service in the terminal display section 42.

In a description below, the user interface is referred to as a "cancel request UI". The account ID 113A and the password 113B may be input to the cancel request UI.

The corresponding charge plan information and the estimated charge amount information are displayed in the cancel request UI.

The dedicated application execution section 402 displays the corresponding charge plan information and the estimated charge amount information instructed to be displayed by the display instruction information in the cancel request UI when receiving the display instruction information from the service providing server 1.

The cancel request UI includes a continuation determination button for determining continued use and a cancel determination button for determining cancel.

When the continuation determination button is operated in the cancel request UI, the dedicated application execution section 402 transmits information on the operation of the continuation determination button to the service providing server 1 using the terminal communication section 41. When the cancel determination button is operated in the cancel request UI, the dedicated application execution section 402 transmits information on the operation of the cancel determination button to the service providing server 1 using the terminal communication section 41. The service providing server 1 executes a charge plan changing process when receiving the information on the operation of the continuation determination button. On the other hand, the service providing server 1 executes a cancel process when receiving the information on the operation of the cancel determination button.

Here, operations of the printer 3 and the service providing server 1 associated with delivery of ink in the delivery service will be described.

The printer controller 30 determines whether trigger for transmitting the printer information has been generated. Examples of the trigger include turning on of electric power, an elapsed predetermined period of time, and termination of one printing operation.

The printer information is associated with the printer 3.

The printer information includes the serial number 113E, the total ink use amount information 313, the transmission copy count information 314, the copy count information 315, and the log file 114C stored in the printer storage section 310.

The printer controller 30 transmits the printer information to the service providing server 1 using the printer communication section 31 when determining that the trigger has been generated.

The database management section 109 of the service providing server 1 determines whether delivery of ink is required based on the total ink use amount information 313 included in the printer information when receiving the printer information. When determining that the delivery of ink is required, the database management section 109 transmits a request for delivery to the delivery server 2 so as to cause the subject possessing the delivery server 2 to delivery ink.

Furthermore, the database management section 109 updates a record in the printer management database 114 based on the received printer information.

Specifically, the database management section 109 updates the total ink use amount information 114A included in the record to total ink use amount information 313B included in the received printer information. The database management section 109 updates the total copy count information 114B by adding the number of copies indicated by the transmission copy count information 313A included in the received printer information to the number of copies indicated by the total copy count information 114B included in the record. The database management section 109 updates the log file 114C included in the record to the log file 114C included in the received printer information.

Furthermore, the database management section 109 updates a record of the use information management database 115 based on the received printer information.

Specifically, the database management section 109 calculate use frequency based on the number of copies indicated by the copy count information 315 included in the received printer information and updates use frequency indicated by the use frequency information 115E included in the record to be updated in the use information management database 115 to the calculated use frequency. Note that the record to be updated in the use information management database 115 is specified based on the serial number 113E included in the received printer information and the account management database 113.

Furthermore, the database management section 109 determines whether the total number of sheets indicated by the total copy count information 114B after update exceeds the number of printable sheets prescribed by the charge plan indicated by the charge plan information 113D associated with the serial number 113E included in the printer information. When the charge plan information 113D is the fourth charge plan, a largest one of the numbers of printable sheets is determined as a target of the comparison. When the determination is affirmative, the database management section 109 notifies the obtaining section 103 of the result of the determination.

Next, operation of the service providing server 1 will be described with reference to FIG. 9.

Figure 9:
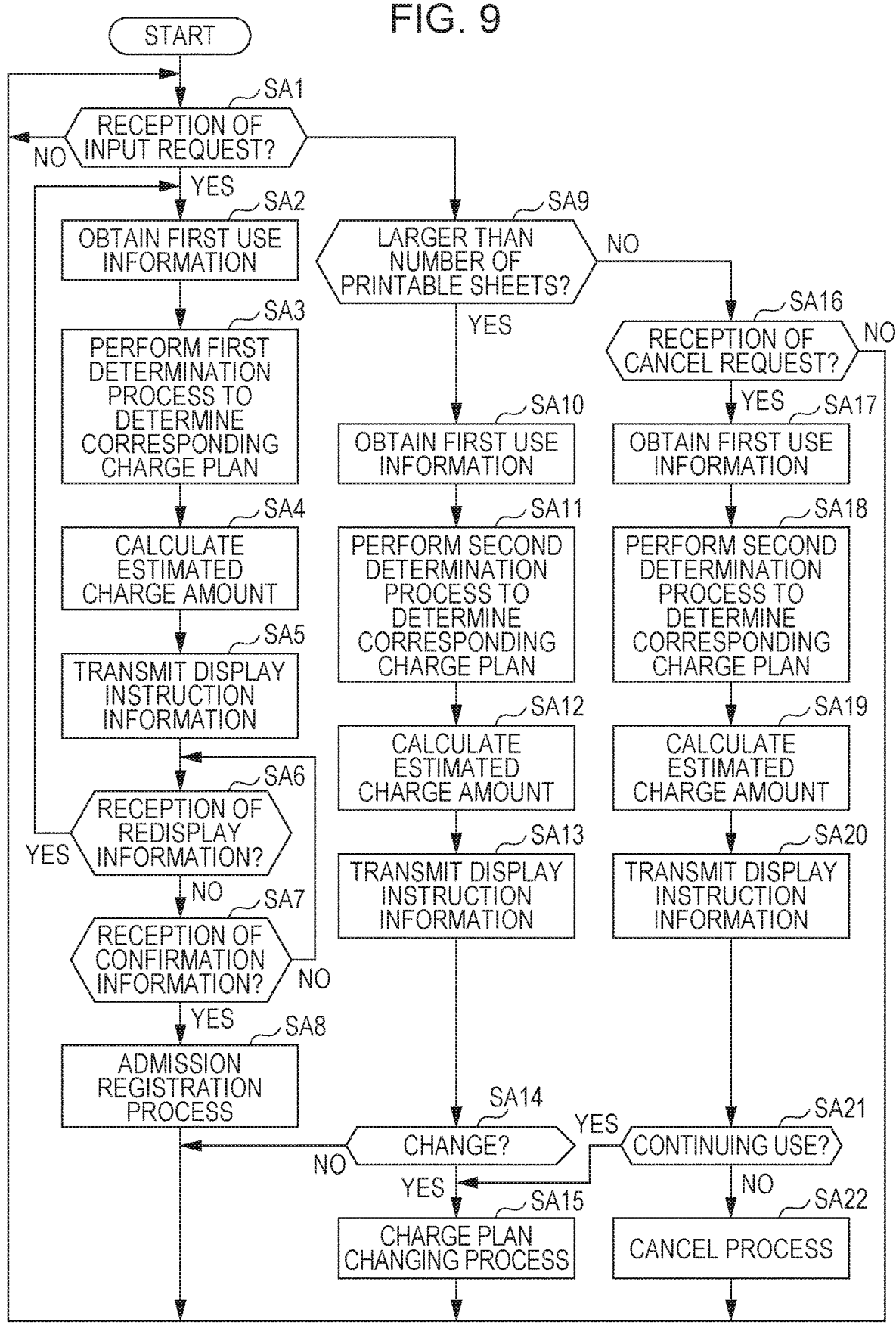
FIG. 9 is a flowchart of an operation of the service providing server.

FIG. 9 is a flowchart of operation of the service providing server 1.

In FIG. 9, an example in which the corresponding charge plan is proposed to the first user Us1 will be described.

The first reception section 101 determines whether an admission request has been received (step SA1).

When the first reception section 101 determines that the admission request has been received (step SA1: YES), the obtaining section 103 obtains first use information included in information on the admission request received by the first reception section 101 (step SA2).

Subsequently, the determination section 104 determines a corresponding charge plan in accordance with the first determination process based on the first use information obtained by the obtaining section 103 in step SA2 (step SA3).

Thereafter, the calculation section 105 calculates an estimated charge amount based on the average copy count indicated by the average copy count information 115F included in the obtained first use information and the corresponding charge plan determined by the determination section 104 (step SA4).

Next, the display controller 106 transmits display instruction information instructing display of the corresponding charge plan information indicating the corresponding charge plan determined by the determination section 104 in step SA3 and the estimated charge amount information indicating the estimated charge amount calculated by the calculation section 105 in step SA4 to the terminal device 4A using the providing server communication section 11 (step SA5).

Next, the determination section 104 determines whether redisplay request information requesting redisplay of the corresponding charge plan information and the estimated charge amount information has been received (step SA6).

When the determination section 104 determines that the redisplay request information has been received (step SA6: YES), the providing server controller 10 executes the process from step SA2 to step SA6 again. Note that, in step SA2, the obtaining section 103 obtains the user type information 115B, the usage information 115C, the use frequency information 115E, and the average copy count information 115F included in the redisplay request information as the first use information.

On the other hand, when the determination section 104 determines that the redisplay request information has not been received (step SA6: NO), the database management section 109 determines whether confirmation information has been received from the terminal device 4A (step SA7).

The database management section 109 returns to step SA6 when determining that confirmation information has not been received from the terminal devices 4 (step SA7: NO). On the other hand, the database management section 109 executes an admission registration process (step SA8) when determining that confirmation information has been received from the terminal device 4A (step SA7: YES).

Returning to the description of step SA1, when the first reception section 101 determines that the admission request has not been received (step SA1: NO), the database management section 109 determines whether a total count indicated by the updated total copy count information 114B exceeds the number of printable sheets (step SA9).

When the database management section 109 determines that the total count exceeds the number of printable sheets (step SA9: YES), the obtaining section 103 obtains the first use information from the account management database 113 (step SA10).

Subsequently, the determination section 104 determines a corresponding charge plan in accordance with a second determination process based on the first use information obtained by the obtaining section 103 in step SA10 (step SA11).

The calculation section 105 calculates an estimated charge amount based on an average copy count indicated by the average copy count information 115F included in the obtained first use information and the corresponding charge plan determined by the determination section 104 (step SA12).

Then the display controller 106 transmits display instruction information indicating display of the corresponding charge plan information indicating the corresponding charge plan determined in step SA11 and the estimated charge amount information indicating the estimated charge amount calculated in step SA12 to the terminal device 4A using the providing server communication section 11 (step SA13).

Thereafter, the database management section 109 determines whether the first user Us1 performs change to the corresponding charge plan displayed in response to the transmission of the display instruction information (step SA14). The database management section 109 performs an affirmative determination in step SA14 when receiving information indicating a request for performing change to the corresponding charge plan from the terminal device 4A.

The database management section 109 returns to the process in step SA1 when determining that the change to the corresponding charge plan is not to be performed (step SA14: NO). On the other hand, the database management section 109 executes a charge plan changing process (step SA15) when determining that the change to the corresponding charge plan is to be performed (step SA14: YES).

In the charge plan changing process, a charge plan indicated by the charge plan information 113D of the record of the first user Us1 included in the account management database 113 is changed to the corresponding charge plan, for example.

Returning to step SA9, when the database management section 109 determines that the total copy count does not exceed the number of printable sheets (step SA9: NO), the second reception section 102 determines whether a cancel request has been received (step SA16).

When the second reception section 102 determines that the cancel request has not been received (step SA16: NO), the providing server controller 10 returns to the process in step SA1.

On the other hand, when the second reception section 102 determines that the cancel request has been received (step SA16: YES), the obtaining section 103 obtains the first use information from the use information management database 115 using the account ID 113A included in the cancel request information received by the second reception section 102 as a key (step SA17).

The determination section 104 determines a corresponding charge plan in accordance with the second determination process based on the first use information obtained by the obtaining section 103 in step SA17 (step SA18). Specifically, the determination section 104 inputs the first use information to the learnt model 117, causes the learnt model 117 to output the charge plan information 113D, and determines a charge plan indicated by the charge plan information 113D output from the learnt model 117 as a corresponding charge plan.

The calculation section 105 calculates an estimated charge amount based on an average copy count indicated by the average copy count information 115F included in the first use information obtained in step SA17 and the corresponding charge plan determined by the determination section 104 (step SA19).

The display controller 106 transmits display instruction information indicating display of the corresponding charge plan information indicating the corresponding charge plan determined in step SA18 and the estimated charge amount information indicating the estimated charge amount calculated in step SA19 to the terminal device 4 using the providing server communication section 11 (step SA20).

The database management section 109 determines whether use of the delivery service is to be continued (step SA21). When information indicating operation of the continuation confirmation button is received, the database management section 109 makes an affirmative determination in step SA21. On the other hand, when information indicating operation of the cancel confirmation button is received, the database management section 109 makes a negative determination in step SA21.

When determining that use of the delivery service is not continued (NO in step SA21), the database management section 109 executes the cancel process (step SA22).

In the cancel process, the database management section 109 removes the record of the first user Us1 from the account management database 113.

When determining that use of the delivery service is continued (step SA21: YES), the database management section 109 executes the charge plan changing process (step SA15).

Modification

Next, a modification will be described.

In the modification, a corresponding charge plan to be proposed may be determined in accordance with a date and time when start of use of a delivery service based on the corresponding charge plan is available. It is assumed that a month when printing is performed a large number of times is determined in advance and charge plan information 113D output from a learnt model 117 is a first charge plan. In this case, when a date and time when start of use of the delivery service based on a corresponding charge plan is included in the predetermined month when printing is performed a large number of times, the determination section 104 determines a second plan or a third plan in which the number of printable sheets which is larger than that of the first charge plan is prescribed or a fourth charge plan of a "multistage flat-rate system" as the corresponding charge plan.

Furthermore, in the modification, the determination section 104 determines one of the first to fourth plans in accordance with the first determination process or the second determination process, and a charge plan is newly generated by changing at least one of the charge for use and the number of printable sheets prescribed by determined one of the charge plans in accordance with a date and time when start of use of the delivery service based on the corresponding charge plan is available. Then the determination section 104 determines the charge plan newly generated as the corresponding charge plan. For example, the determination section 104 may increase the number of printable sheets for months in examination season or new-year greeting season or reduce the charge for use for such months.

According to the foregoing embodiment and the modification, effects are obtained as below. In a description of the effects below, an example in which a corresponding charge plan is proposed for the first user Us1 is described.

A service providing server 1 provides a delivery service delivering ink. The service providing server 1 includes an obtaining section 103 obtaining first use information associated with use of the delivery service of a first user Us1, a determination section 104 determining a corresponding charge plan corresponding to the first use information based on the first use information obtained by the obtaining section 103, second use information associated with use of the delivery service by a second user Us2, and a selected charge plan which is a charge plan of the delivery service selected by the second user Us2, and a display controller 106 displaying corresponding charge plan information indicating the corresponding charge plan determined by the determination section 104 in a terminal device 4A of the first user Us1.

A service providing system 1000 includes an obtaining section 103 obtaining first use information associated with use of the delivery service of a first user Us1, a determination section 104 determining a corresponding charge plan corresponding to the first use information based on the first use information obtained by the obtaining section 103, second use information, and a selected charge plan, and a display controller 106 displaying corresponding charge plan information indicating the corresponding charge plan determined by the determination section 104 in a terminal device 4A of the first user Us1.

A method for controlling the service providing server 1 includes obtaining the first use information, determining a corresponding charge plan corresponding to first use information based on the obtained first use information and second use information and a selected charge plan, and displaying corresponding charge plan information indicating a corresponding charge plan determined by the determination section 104 in the terminal device 4A of the first user Us1.

According to the service providing server 1, the service providing system 1000, and a method for controlling the service providing server 1, a charge plan corresponding to use of the delivery service of the first user Us1 may be determined taking not only information on the use of the delivery service of the first user Us1 but also information on the use of the delivery service of the second user Us2 into consideration, and the determined charge plan may be proposed for the first user Us1. According to the service providing server 1, the service providing system 1000, and the method for controlling the service providing server 1, an appropriate charge plan of the delivery service may be proposed for the first user Us1.

The first user information includes first use state information indicating a use state of the first user Us1 in the delivery service.

Accordingly, since the determination section 104 may determine the corresponding charge plan based on the use state of the first user Us1 in the delivery service, a charge plan suitable for the use state of the first user Us1 may be proposed. Consequently, a more appropriate charge plan of the delivery service may be proposed for the first user Us1.

The second use information includes second use state information indicating a use state of the second user Us2 in the delivery service.

Accordingly, since the determination section 104 may determine the corresponding charge plan based on the user state of the second user Us2 in the delivery service, a corresponding charge plan taking the use state of the other user Us into consideration may be proposed for the first user Us1. Consequently, a more appropriate charge plan of the delivery service may be proposed for the first user Us1.

The first use state information includes the average copy count information 115F indicating an average copy count of print media copied by the printer 3. The calculation section 105 is provided to calculate an estimated charge amount which may be charged by the first user Us1 when the first user Us1 selects a corresponding charge plan based on a copy count indicated by the average copy count information 115F and the corresponding charge plan determined by the determination section 104. The display controller 106 causes the terminal device 4A to display estimated charge amount information indicating the estimated charge amount calculated by the calculation section 105 along with the corresponding charge plan.

Accordingly, since the estimated charge amount information may be proposed along with the corresponding charge plan information, a charge amount generated when the user selects a charge plan, usability may be enhanced when the corresponding charge plan is proposed.

The service providing server 1 includes the providing server storage section 110 storing the learnt model 117 obtained by machine learning based on the data set 116A in which at least second use information and selected charge plan information are associated with each other. The determination section 104 inputs the first use information obtained by the obtaining section 103 to the learnt model 117 stored in the providing server storage section 110, causes the learnt model 117 to output the charge plan information 113D, and determines a charge plan indicated by the charge plan information 113D output from the learnt model 117 as a corresponding charge plan.

A charge plan appropriate for the user may be determined by an input to the learnt model 117 using the leant model obtained by the machine learning based on the data set 116A in which at least the second use information and the selected charge plan are associated with each other. Consequently, a more appropriate charge plan of the delivery service may be easily proposed for the first user Us1.

The service providing server 1 includes the first reception section 101 receiving an admission request for the delivery service issued by the first user Us1. The display controller 106 displays corresponding charge plan information in the terminal device 4A when the first reception section 101 receives the admission request.

Consequently, a more appropriate charge plan of the delivery service may be proposed for the first user Us1 at the time of admission to the delivery service. Specifically, the first user Us1 does not use the delivery service at the time of admission, and therefore, an appropriate corresponding charge plan may not be proposed when only the first use information is used. However, a corresponding charge plan is determined and proposed taking not only the information on use of the delivery service of the first user Us1 but also information on use of the delivery service of the second user Us2 into consideration, and an appropriate charge plan of the delivery service may be proposed for the first user Us1 at the time of admission.

The service providing server 1 includes the second reception section 102 receiving a cancel request for canceling the delivery service from the first user Us1. The display controller 106 displays the corresponding charge plan information in the terminal device 4A when the second reception section 102 receives the cancel request.

Consequently, a more appropriate charge plan of the delivery service may be proposed for the first user Us1 at the time of admission to the delivery service.

The charge plan is a plan in which at least a charge for use of the delivery service in a predetermined period of time and the number of printable sheets which is the number of sheets printable by the printer 3 without extra charge in addition to the charge for use in the predetermined period of time are prescribed. The determination section 104 determines the corresponding charge plan by differentiating at least one of the charge for use and the number of printable sheets in accordance with a date and time when start of use of the delivery service is available based on the corresponding charge plan.

Accordingly, since the corresponding charge plan in which at least one of the charge for use and the number of printable sheets is differentiated in accordance with a date and time when start of use of the delivery service is available based on the corresponding charge plan may be proposed, a charge plan of the delivery service which is attractive for the first user Us1 may be proposed.

The determination section 104 determines the corresponding charge plan in which the number of printable sheets is differentiated in accordance with a month when start of use of the delivery service is available based on the corresponding charge plan.

For example a large number of sheets may be printed depending on a month, such as new-year greeting season or examination season. Therefore, a corresponding charge plan in which the number of printable sheets is differentiated in accordance with a month when start of use of the delivery service is available based on the corresponding charge plan may be proposed. Accordingly, a charge plan of the delivery service attractive for the first user Us1 may be proposed.

The embodiment and the modification are merely examples of the present disclosure, and further modifications and applications may be appropriately performed within the scope of the present disclosure.

For example, a charge plan determined in accordance with the first determination process is proposed when an admission request is performed and a charge plan determined in accordance with the second determination process is proposed when the number of printed sheets per month exceeds the number of printable sheets and when a cancel request is performed in the foregoing embodiment and the modification. However, a charge plan determined in accordance with the second determination process may be proposed when the admission request is performed and a charge plan determined in accordance with the first determination process may be proposed when the number of printed sheets per month exceeds the number of printable sheets and when a cancel request is performed.

For example, although a charge plan in which a charge for use and the number of printable sheets per month are prescribed is illustrated in the foregoing embodiment and the modification, the predetermined period of time of the charge plan is not limited to one month.

Although four charge plans are set in the delivery service for example in the foregoing embodiment and the modification, the delivery service may set a larger number of charge plans or a smaller number of charge plans.

Although the printer 3 employing the CISS method is illustrated in the foregoing embodiment and the modification, the printer 3 may be a print device including an ink cartridge mounted thereon. In this case, the ink cartridge filled with ink is delivered to a delivery destination in the delivery service.

The printer 3 described above may be a multifunction peripheral having a scanning function and a facsimile function in addition to the print function, for example.

The use state of the user Us indicated by the use state information 115D is not limited to the use frequency and the average copy count, and a larger number of elements may be provided as long as the elements indicate use states, such as an ink consumption amount, other elements may be provided, or a smaller number of elements may be provided.

Although the average copy count information 115F is illustrated as the copy count information, the copy count information is not limited to information indicating the average copy count and information indicating a total number of sheets printed per month or information on a total number of sheets obtained after the delivery service is used may be used. In this case, the use state information 115D includes, instead of the average copy count information 115F or in addition to the average copy count information 115F, information indicating the total number of sheets printed per month and information indicating the total number of sheets printed after start of use of the delivery service. Furthermore, in this case, the axis of abscissae in the first determination process may be the total number of sheets printed per month or the total number of sheets printed after start of use of the delivery service instead of the average copy count indicated by the average copy count information 115F.

Although a serial ink jet printer is illustrated as the printer 3 in the foregoing embodiment, the printer 3 may be a line type ink jet printer.

For example, ink is illustrated as consumables of the printer 3 and the ink is delivered in the foregoing embodiment. However, the consumables to be delivered are not limited to ink and a waste box storing ink discharged as waste liquid in maintenance of an ink jet head, for example, may be included in the consumables. Furthermore, in a case of an electrophotographic printer, toner may be included in the consumables.

For example, the functions of the providing server controller 10, the printer controller 30, and the terminal controller 40 may be realized by a plurality of processors or a semiconductor chip.

Furthermore, the sections illustrated in FIG. 2 and FIG. 8 are examples and concrete implemented forms are not particularly limited. Specifically, it is not necessarily the case that hardware portions individually corresponding to the sections are implemented, and a single processor may execute programs so as to realize the functions of the section. Furthermore, some of the functions realized by software in the foregoing embodiment may be realized by hardware or some of the functions realized by hardware may be realized by software. Moreover, detailed configurations of the other sections included in the service providing system 1000 are also arbitrarily modified without departing from the scope of the present disclosure.

Furthermore, step units of the operation illustrated in FIG. 9, for example, are obtained by division performed according to main processing content for facilitating understanding of the operations of the devices included in the service providing server 1, and the present disclosure is not limited by a division method in a processing unit and a name. The operations may be divided into a larger number of step units depending on processing content. Furthermore, one step unit may be divided so as to include a larger number of processes. Moreover, order of the steps may be appropriately changed without departing from the scope of the present disclosure.

What is claimed is:

1. An information processing apparatus providing a delivery service delivering consumables of a print apparatus, the information processing apparatus comprising:
   an obtaining section configured to obtain first use information associated with use of the delivery service by a first user;
   a determination section configured to determine a corresponding charge plan which is one of charge plans of the delivery service corresponding to the first use information obtained by the obtaining section based on the first use information obtained by the obtaining section, second use information associated with use of the delivery service by a second user, and a selected charge plan which is one of the charge plans of the delivery service selected by the second user; and
   a display controller configured to display corresponding charge plan information indicating the corresponding charge plan determined by the determination section in a terminal device of the first user.

2. The information processing apparatus according to claim 1, wherein
   the first use information includes first use state information indicating a use state of the first user in the delivery service.

3. The information processing apparatus according to claim 1, wherein
   the second use information includes second use state information indicating a use state of the second user in the delivery service.

4. The information processing apparatus according to claim 2, wherein
   the first use state information includes copy count information indicating the number of copies of print media copied by the print apparatus,
   the information processing apparatus further includes a calculation section configured to calculate a charge amount to be charged by the first user when the first user selects the corresponding charge plan based on the number of copies indicated by the copy count information and the corresponding charge plan determined by the determination section, and the display controller displays charge amount information indicating the charge amount calculated by the calculation section along with the corresponding charge plan information in the terminal device.

5. The information processing apparatus according to claim 1, further comprising:

a storage section configured to store a learnt model obtained by machine learning performed based on a data set in which the second use information and selected charge plan information indicating the selected charge plan are associated with each other, wherein the determination section inputs the first use information obtained by the obtaining section to the learnt model stored in the storage section, outputs charge plan information indicating the charge plan from the learnt model, and determines the charge plan indicated by the charge plan information output from the learnt model as the corresponding charge plan.

6. The information processing apparatus according to claim 1, further comprising:

a first reception section configured to receive an admission request for the delivery service by the first user, wherein the display controller displays the corresponding charge plan information in the terminal device when the first reception section receives the admission request.

7. The information processing apparatus according to claim 1, further comprising:

a second reception section configured to receive a request for cancelling the delivery service from the first user, wherein the display controller displays the corresponding charge plan information in the terminal device when the second reception section receives the cancel request.

8. The information processing apparatus according to claim 1, wherein the charge plan is a plan in which at least a charge for use of the delivery service in a predetermined period of time and the number of printable sheets which is the number of sheets printable by the print apparatus without charge in addition to the charge for use in the predetermined period of time are prescribed, and the determination section determines the corresponding charge plan by differentiating at least one of the charge for use and the number of printable sheets in accordance with a date and time when start of use of the delivery service is available based on the corresponding charge plan.

9. The information processing apparatus according to claim 8, wherein the determination section determines the corresponding charge plan in which the number of printable sheets is differentiated in accordance with a month when start of use of the delivery service is available based on the corresponding charge plan.

10. A service providing system providing a delivery service delivering consumables of a print apparatus, the service providing system comprising:

an obtaining section configured to obtain first use information associated with use of the delivery service by a first user;

a determination section configured to determine a corresponding charge plan which is one of charge plans of the delivery service corresponding to the first use information obtained by the obtaining section based on the first use information obtained by the obtaining section, second use information associated with use of the delivery service by a second user, and a selected charge plan which is one of the charge plans of the delivery service selected by the second user; and a display controller configured to display corresponding charge plan information indicating the corresponding charge plan determined by the determination section in a terminal device of the first user.

11. A method for controlling an information processing apparatus providing a delivery service delivering consumables of a print apparatus, the method comprising:

obtaining first use information associated with use of the delivery service by a first user;

determining a corresponding charge plan which is one of charge plans of the delivery service corresponding to the first use information obtained by the obtaining section based on the first use information obtained by the obtaining section, second use information associated with use of the delivery service by a second user, and a selected charge plan which is one of the charge plans of the delivery service selected by the second user; and displaying corresponding charge plan information indicating the corresponding charge plan determined by the determination section in a terminal device of the first user.

* * * * *